No. 754,730. PATENTED MAR. 15, 1904.
R. B. WILLIAMS, Jr. & E. B. WHITMAN.
LIQUID DISTRIBUTING SYSTEM.
APPLICATION FILED APR. 29, 1903.
NO MODEL. 2 SHEETS—SHEET 1.
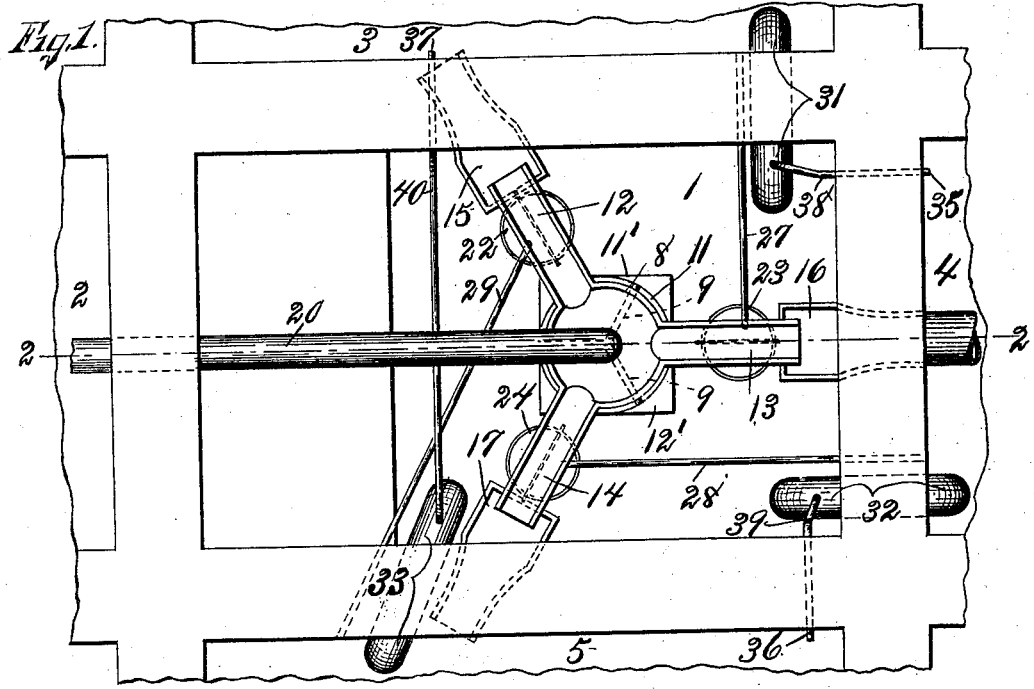
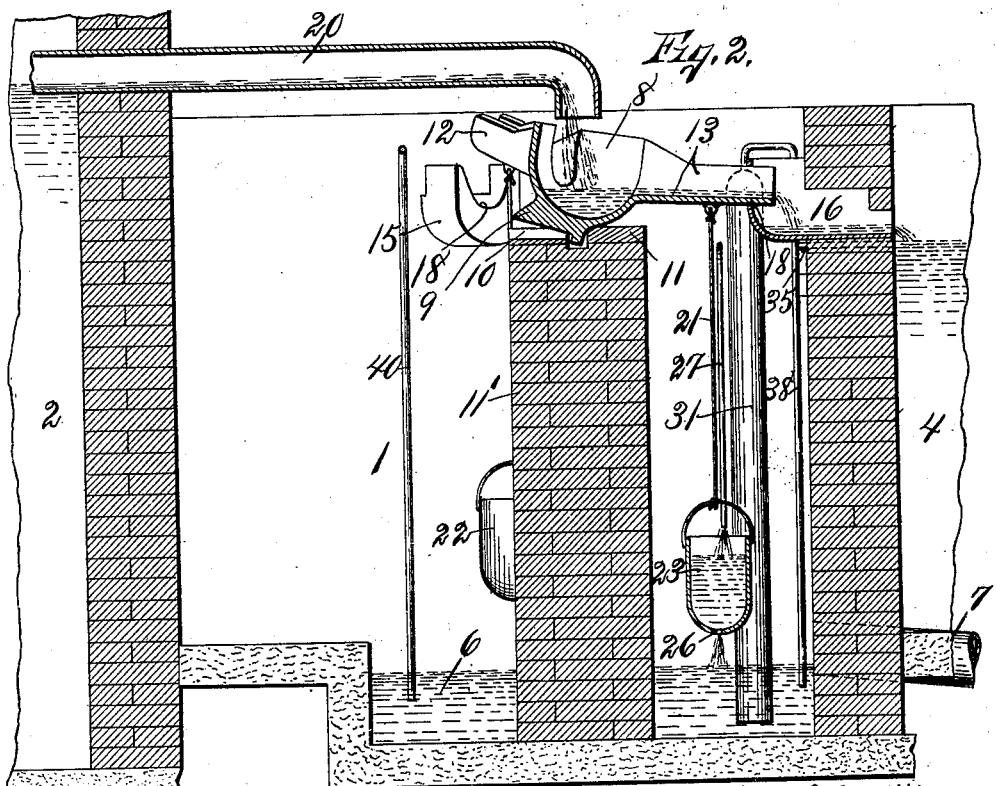

No. 754,730. PATENTED MAR. 15, 1904.
R. B. WILLIAMS, Jr. & E. B. WHITMAN.
LIQUID DISTRIBUTING SYSTEM.
APPLICATION FILED APR. 29, 1903.
NO MODEL. 2 SHEETS—SHEET 2.
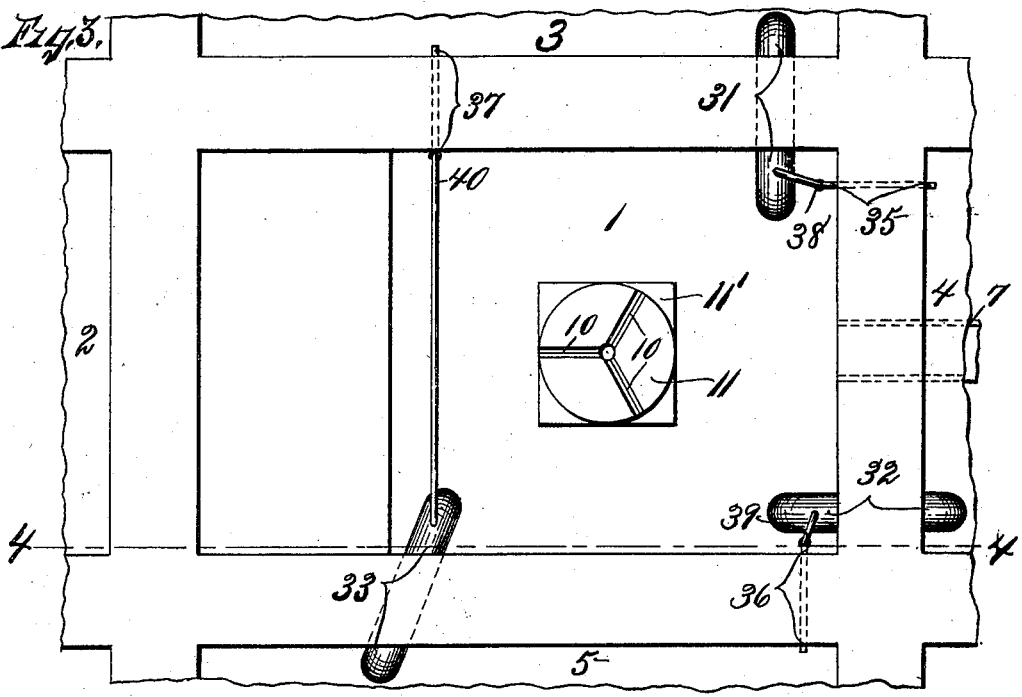
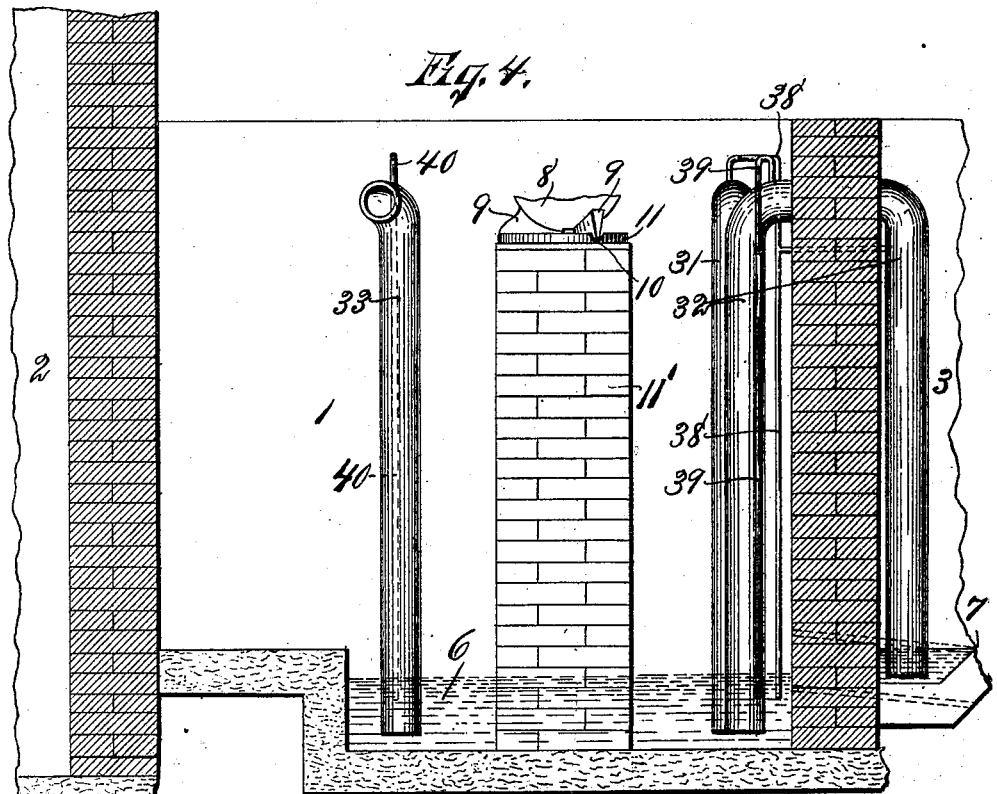

No. 754,730. Patented March 15, 1904.

UNITED STATES PATENT OFFICE.

ROGER BUTLER WILLIAMS, JR., AND EZRA BAILEY WHITMAN, OF NEW YORK, N. Y.

LIQUID-DISTRIBUTING SYSTEM.

SPECIFICATION forming part of Letters Patent No. 754,730, dated March 15, 1904.

Application filed April 29, 1903. Serial No. 154,812. (No model.)

*To all whom it may concern:*

Be it known that we, ROGER BUTLER WILLIAMS, Jr., and EZRA BAILEY WHITMAN, of New York, in the county of New York, in the State of New York, have invented new and useful Improvements in Liquid-Distributing Systems, of which the following, taken in connection with the accompanying drawings, is a full, clear, and exact description.

This invention relates to an improved system for the automatic distribution of liquids, and is particularly useful in connection with certain forms of apparatus employed in the purification of sewage, in which the liquid undergoes certain treatment in a tank provided therefor and is subsequently drawn off or discharged upon the surface or surfaces of specially-prepared contact-beds in a manner well known to those skilled in the art, the essential feature of this system of purification being that the liquid is brought into contact with the bacteria in the contact-beds for a definite period of time, after which said beds are allowed to stand empty exposed to the air in order that the bacteria may absorb a fresh supply of oxygen for oxidizing the deposit of liquid sewage.

The object of our present invention is to provide means whereby the flow of the liquid from the main supply-tank—as, for instance, a septic-tank—is automatically and successively diverted from one tank or bed into one or more additional tanks or beds as each is successively filled, so that the filling of the several tanks or beds forms a continuous cycle—that is, the liquid is caused to flow into one tank or bed until it reaches a predetermined level, whereupon the flow is automatically diverted to a second tank until it assumes a certain level, when it is diverted from the second tank to a third tank, and in like manner may be diverted into any number of additional tanks until finally to complete the cycle the liquid is automatically diverted into the first bed after each is successively filled.

Another equally important purpose of this apparatus is to provide means whereby the receiving tanks or beds previously filled are automatically and successively emptied to complete the cycle of distribution similar to the filling cycle, so that the tank or receiving-bed which is first filled is emptied automatically before the filling cycle is completed.

Further objects and uses will appear in the subsequent description.

In the drawings, Figure 1 is a top plan of a portion of a sewage-purification plant, showing the application of my invention thereto. Fig. 2 is a sectional view taken on line 2 2, Fig. 1. Fig. 3 is a top plan similar to Fig. 1, showing particularly the siphonic means for successively and automatically emptying the tanks or contact-beds, the liquid-distributing bowl for successively filling the several tanks or beds being omitted for the purpose of showing the supporting-pier and knife-bearings upon which the bowl rests. Fig. 4 is a sectional view taken on line 4 4, Fig. 3.

Similar reference characters indicate corresponding parts in all the views.

Although we have shown our invention as applied to an apparatus for the treatment of liquid sewage, it will be distinctly understood that it is equally applicable for other uses in which it is desired to automatically and successively distribute liquid from a primary source to one or a series of secondary receptacles, so that the operation constitutes a complete cycle in the filling of the several secondary receptacles. In like manner it will be apparent that the cycle of operation in emptying these several receptacles may be employed in other relations and that any distributing or filling means may be employed in connection with our specific emptying device or devices.

In describing this invention reference is had to the accompanying drawings, in which a central reservoir 1 is surrounded by a series of tanks 2, 3, 4, and 5, which may be of any desired form, size, or construction adapted to contain the liquid to be treated.

It will be noted that we have shown only a small portion of each of the tanks or beds 2, 3, 4, and 5 for the reason that these do not form any part of our present invention except as may be inseparably related to the operation of the mechanisms hereinafter described, said outer tanks being indicated for the purpose of clearly demonstrating the operation of said mechanism.

Our improved system of liquid distribution may be classified, respectively, as an automatic liquid-distributing device for successively and automatically filling the tanks and a siphonic system for successively and automatically emptying the tanks or beds; but each is dependent upon the other for successfully carrying out the objects of our invention. Before describing either of these filling or emptying devices it may be stated that the central tank or reservoir 1 is provided with a depression in its bottom wall for containing a body of liquid 6, which is maintained at a predetermined level by means of an overflow-conduit 7, the object of this body of liquid being to form a liquid seal for the lower ends of the siphon-pipes presently described.

For convenience of description the tank 2 may be termed the "septic-tank," while the beds 3, 4, and 5 are adapted to successively receive the liquid flowing from the septic-tank 2.

We will now proceed to describe the distributing or filling apparatus, which consists of a semispherical bowl 8, having depending radial ribs 9, resting in radial grooves 10 in a bearing-plate 11, the latter being supported upon the upper face of a pier 11', which rises from the bottom wall of the receptacle 1. I preferably provide three of these knife-edges 10, which radiate from a point in the axis of the bowl 8, so as to divide the intersecting circle in equal angles. This bowl is provided with radial channeled arms 12, 13, and 14, which are spaced equidistant from each other and are disposed in radial lines midway between the diverging knife-edges 10, so as to facilitate the easy tilting movement of the bowl, which is substantially balanced in the grooves in the plate 11. These arms preferably incline upwardly from the normal horizontal plane of the bowl to insure a cutting off of the flow of the liquid through the channels except the one through which the liquid is discharged. The upright inclosing walls between the receptacle 1 and tanks or beds 3, 4, and 5 are provided with openings near their upper ends for receiving suitable conduits 15, 16, and 17, which are alined, respectively, with the arms 12, 13, and 14, the inner ends of said conduits being provided with seats 18 for receiving and holding the outer ends of the arms 12, 13, and 14 when operatively connected to their respective conduits, the seats 18 serving also to limit the tilting movement of the bowl.

The outer ends of the conduits 15, 16, and 17 discharge, respectively, into the tanks or beds 3, 4, and 5, and the septic liquid is introduced into the bowl 8 from the tank 2 through a suitable conduit 20.

Secured to each of the arms 12, 13, and 14 and depending therefrom by suitable rods or cables 21 are a series of buckets 22, 23, and 24, each of which is suspended from a bail at the end of the cable 21 and is provided with a restricted outlet-passage 26 centrally in its bottom wall.

Leading from the tanks 3, 4, and 5 through the adjacent partition-walls are small overflow-conduits 27, 28, and 29, the points of overflow being in planes slightly beneath the conduits 15, 16, and 17, the inner ends of the pipes 27, 28, and 29 discharging, respectively, into the buckets 23, 24, and 22.

The restricted passages 26 are of slightly less diameter than the diameter of the overflow-conduits 27, 28, and 29.

The operation of the distributing and filling apparatus just described is as follows: Assuming that the tank or bed 3 has been previously filled to the point of overflow through the conduit 27, which overflow is conducted into the bucket 23, thereby depressing the bucket, as seen in Fig. 2, and automatically tilting the bowl 8, so that the channeled arm 13 discharges into the conduit 16 and thence into the receptacle 4, now when the liquid rises in the tank or bed 4 to the level of the overflow 28 it will be conducted to the bucket 24, depending from the channeled arm 14 of the bowl 8, whereupon when the bucket is sufficiently filled to counteract the weight of the arms 12 and 13 said channeled arm 14 will be tilted automatically to discharge the liquid from the bowl 8 into the conduit 17 and thence into the tank 5. In like manner the overflow from the tank 5 is conducted to the bucket 22, which in due time depresses the channeled arm 12 and diverts the flow of the liquid from the bowl 8 into the conduit 15 and thence into the tank or bed 3, thus completing the cycle of operation of filling the tanks or beds 3, 4, and 5, it being understood that although the liquid is permitted to flow into the buckets faster than it escapes through the orifice 26, yet each of these orifices is sufficient to drain the liquid from the buckets shortly after the overflow ceases.

We will now proceed to describe the apparatus for successively and automatically emptying each of the tanks 3, 4, and 5, which consists of a series of siphons 31, 32, and 33, which are passed through the adjacent walls of the tanks or beds 3, 4, and 5, the inner legs of each of the siphons being immersed in the liquid seal 6, and the outer legs are immersed in the liquid in the beds 3, 4, and 5. Leading from the tanks or beds 4, 5, and 3 through the adjacent walls, which divide said tanks or beds from the central reservoir 1, are a series of overflow-pipes 35, 36, and 37, which are connected to upright pipes 38, 39, and 40, the lower ends of which are immersed in the liquid seal 6, and their upper ends extend above their respective overflow-pipes 35, 36, and 37 and are tapped into the upper ends of the siphons 31, 32, and 33, so that the liquid rising in the tank or bed 4 and overflowing through the conduit 35 falls downwardly through the pipe 38, and thereby creates a partial vacuum in the upper end of the siphon 31, which causes the liquid in the tank or bed 3 to be siphoned into the central receptacle 1, from which it escapes through the overflow-pipe 7, this siphonic action continuing until the tank or bed 3 is entirely empty. In like manner the tank or bed 4 is emptied by the overflow from the tank 5 into the conduit 36, which brings the siphon 32 into action, and in the same way the overflow from the tank or bed 3 causes the siphonic action in the device 33 to empty the tank or bed 5, thus completing the cycle of successively and automatically emptying all of the tanks 3, 4, and 5. It will be readily understood that this emptying system is inseparable from the filling apparatus for the reason that as soon as the liquid has been diverted from one tank or bed to the next successive tank or bed the filling of the latter causes the emptying of the former, the operation of filling and emptying being continuous and successive, as well as automatic; but it will be also apparent that the specific filling apparatus may be used with modified forms of emptying devices and that the specific emptying means may be used with a modified apparatus for filling. Therefore the claims to each of these devices may be drawn without reference to the other.

Having thus described our invention, what we claim, and desire to secure by Letters Patent, is—

1. In a liquid-distributing system, a liquid-receiver having separate outlets in radial lines at an angle with each other and tiltable in the direction of each outlet, and means actuated by portions of the accumulating overflow from one of the outlets to automatically tilt the receiver in the direction of one of its other outlets.

2. In a liquid-distributing system, a liquid-receiver balanced to tilt in different radial angles and having a plurality of outlets one at each tilting angle the receiver being automatically and successively tilted in the direction of each outlet by portions of the accumulated liquid escaping from one of the outlets.

3. In combination with a tiltable bowl having separate outlets radiating at different angles from the center of the bowl, a liquid-supply discharging continuously into the bowl, and means actuated by portions of the accumulated discharge from one of the outlets for tilting the bowl in the direction of one of its other outlets.

4. In combination with a tiltable bowl having separate outlets extending in different radial lines from the center of the bowl, a liquid-supply discharging continuously into the bowl and separate devices for successively tilting the bowl in the direction of its outlets, the device for each outlet being brought into action by portions of the accumulated discharge from one of the other outlets.

5. A liquid-feed and a receiving-bowl having separate outlets in different radial lines, said bowl being balanced to tilt in the direction of and to discharge from each outlet successively and separately and separate devices actuated by the discharge from said outlets to tilt the bowl whereby a continuous cycle of automatic discharges is established.

6. In combination, a liquid-feed, a receiving-bowl having radial channeled arms and adapted to tilt in the direction of each arm, buckets suspended from the arms, and means to conduct portions of the accumulated discharge from one arm to the bucket of another arm whereby the bowl is tilted in the direction of the latter arm.

7. In combination, a liquid-feed, a receiving-bowl having radial channeled arms and adapted to tilt in the direction of each arm, buckets suspended from the arms, and means to conduct portions of the accumulated discharge from one arm to the bucket of another arm whereby the bowl is tilted in the direction of the latter arm, said buckets having drainage-orifices.

8. In combination, a liquid-supply, a tank receiving the liquid, an overflow-pipe leading from the tank and determining the level of the liquid therein, a siphon having one leg immersed in the liquid in the tank, an upright pipe connected to the overflow-pipe and tapped into the siphon whereby the liquid flowing through the overflow and downwardly into the upright pipes causes a partial vacuum in the siphon to automatically start the flow of liquid from the tank through the siphon.

9. In combination with a plurality of tanks, means for discharging liquid into the tanks, separate siphons immersed in the liquid of the tanks to draw off the water from each tank separately, each tank having an overflow-conduit discharging beneath the water-line and tapped into the siphon of one of the other tanks at a point above the water-line whereby the overflow from one tank brings into action the siphon of the other tank with which its overflow is connected to discharge the same.

10. In a liquid-distributing system, a liquid-feed, a tiltable bowl receiving the liquid and provided with channeled arms for conducting the liquid from the bowl, separate tanks for receiving the liquid from said arms, buckets attached to the arms, overflow-conduits leading from the tanks, that from one tank discharging into the bucket of another tank, separate siphons for drawing off the liquid from the tanks additional overflow-conduits from said tanks, that from one tank being connected to produce a partial vacuum in the siphon of another tank to start the flow therein.

11. In combination with a series of tanks and a liquid-supply, a bowl receiving the liquid from the supply and provided with a series of outlets radiating at different angles from the center of the bowl one for each tank, said bowl being adapted to be tilted in the direction of each outlet, overflow-conduits for the tanks, separate devices actuated by the separate overflows to successively tilt the bowl in the direction of each outlet, and automatic devices brought into action by the liquid in the tanks to successively empty the latter.

12. In combination, a liquid-supply, a tank receiving the liquid, an overflow-pipe leading from the tank, a second liquid-containing tank, a siphon having one leg immersed in the liquid in the second tank, a liquid seal for the other end of the siphon, and an upright pipe connected to the overflow and also to the upper portion of the siphon, whereby the liquid from the overflow descending in the upright pipe causes a partial vacuum in the upper end of the siphon and starts the flow of liquid from the second tank through the siphon.

13. In a liquid-distributing system, a bowl and radial bearings therefor, the bowl having outlets between the bearings and tiltable in the direction of the outlets, in combination with means for supplying liquid to the bowl and automatic means for tilting the bowl successively in the direction of each outlet.

14. In a liquid-distributing system, a support having radial grooves, a bowl having its bottom provided with radial ribs seated in the grooves, channeled arms projecting radially from the bowl between its ribs, means for supplying liquid to the bowl, and means actuated by the liquid overflowing from one of the arms to tilt the bowl in the direction of one of the other arms.

15. In a liquid-distributing system, a bowl and support therefor, one of the parts having radial grooves and the other radial ribs seated in the grooves, channeled arms projecting radially from the bowl, buckets suspended from the arms, means to supply liquid to the bowl, a receptacle for each arm to receive the liquid therefrom, and separate overflow-pipes discharging into the buckets.

In witness whereof we have hereunto set our hands this 23d day of April, 1903.

ROGER BUTLER WILLIAMS, JR.
EZRA BAILEY WHITMAN.

Witnesses:
RALPH F. PROCTOR,
L. G. MULLER.